United States Patent [19]

Gerdes

[11] 4,056,121
[45] Nov. 1, 1977

[54] PRESSURE COMPENSATION VALVE ARRANGEMENT

[75] Inventor: Theodor Gerdes, 24, Lortzingweg, D 4018 Langenfeld, Rheinland, Germany

[73] Assignee: Blau KG Fabrik fur Kraftfahrzeugteile, Langenfeld, Germany

[21] Appl. No.: 691,407

[22] Filed: June 1, 1976

[30] Foreign Application Priority Data

June 10, 1975 Germany .............................. 2525708

[51] Int. Cl.² ........................................... F16K 15/06
[52] U.S. Cl. ..................................................... 137/541
[58] Field of Search ........................... 137/541, 543.21; 251/86; 220/203

[56] References Cited
U.S. PATENT DOCUMENTS

| | | | |
|---|---|---|---|
| 2,072,271 | 3/1937 | Meadows | 137/542 X |
| 2,870,576 | 1/1959 | Parker | 137/541 X |
| 3,001,546 | 9/1961 | Salisbury | 137/541 |
| 3,047,235 | 7/1962 | Eshbaugh et al. | 220/203 X |
| 3,335,751 | 8/1967 | Davis, Jr. | 137/541 |
| 3,486,522 | 12/1969 | Ashmar | 251/86 X |

Primary Examiner—William R. Cline

[57] ABSTRACT

A pressure compensation valve arrangement for opening automatically with the occurrence of a pressure difference on opposite sides of a dividing wall including a valve stem having a valve head at one end biassed into sealing relationship against an annular valve seat by a compression valve spring acting at the side of the dividing wall remote from the head and at a flange at the other end of the valve stem. The valve stem at its other end has a hollow cavity and has laterally recessed openings between vertically shaped connecting ribs. The cavity and openings communicate with a passageway bounded by the valve seat when the pressure on the valve stem exceeds a predetermined safety value.

7 Claims, 2 Drawing Figures

PRESSURE COMPENSATION VALVE ARRANGEMENT

BACKGROUND OF THE INVENTION

The present invention relates to pressure compensation valve arrangements for valve stems which are provided with valve heads biassed under spring pressure into sealing engagement against a rigid annular valve seat of a support. The valve stem passes through the valve hole and is movable therethrough by spring pressure acting against the other side of the valve support such that with the occurrence of excess or vacuum pressure the valve is opened automatically and operates to automatically ensure pressure compensation.

It has been proposed in U.S. Pat. Nos. 1,378,724 and 3,080,995 (CURTISS-WRIGHT) or German Offenlegungsschrift Nos. 1,580,140 and 2,028,383 in fuel tanks of automotive vehicles to use automatically acting valves within the closure caps of such tanks. These valves are retained tightly sealed subject to compression spring force and, with the occurrence of excess or reduced pressure in the tank, a respective valve opens automatically and again seals automatically tightly subject to spring force after pressure compensation has occurred. A serious disadvantage of such automatically acting pressure compensation valves resides in that, especially with the occurrence of large pressures during the opening of the valve, the compression springs located intermediate the valve hole and the interior of the fuel tank inadequately effect automatic opening and closing of the valve for gas pressure compensation. A more adverse effect particularly results if with the occurrence of increased pressure within the sealed fuel tank, the valves open correspondingly further against spring pressure forces which consequently produce a stronger compression of the springs. The cross-sectional flow area towards the valve hole will become forcibly constricted with the increased opening of the valve head. Eventually a fully compressed spring will block all gas flow towards the valve hole.

SUMMARY OF THE INVENTION

It is thus an object of the invention, generally and independently of the given intended uses for valves having tappet-like acting valve stem members, to control gas flow towards the valve hole. At the beginning of a valve opening a sufficient cross-sectional flow area is immediately produced which then, particularly for adaptation of large pressures, becomes greater so that with valves opening to a larger extent against spring forces, a correspondingly greater gas pressure compensation is ensured in a relatively short time.

According to the present invention there is provided a valve arrangement for opening automatically with the occurrence of a pressure difference on opposite sides of a dividing wall or valve support. The arrangement includes a valve stem having a valve head at one end biassed into sealing relationship against a rigid ring valve seat of the dividing wall by a compression valve spring. One end of the spring acts on the side of the dividing wall remote from the head and the other end of the spring acts against a flange end of the valve stem. The spring is operative to seal the valve hole when equal pressure conditions exist on both sides of the valve head. The valve stem is hollow for forming a cavity having a large cross-sectional flow area and has laterally recessed openings between vertically extending shaped connecting ribs. The ribs project radially outwards, are equidistantly spaced about the stem, and extend to the end flange for the valve control spring. The connecting ribs have dome-shaped lower portions at the end flange.

The technical progress according to the invention compared with known pressure compensation valves resides in that now, due to the partly hollow construction of the valve stem, a larger flow cross-section as connection to the outside immediately occurs during opening of the valve. Gas flows not only through the convolutions of the spring but also through the hollow cavity of the valve stem itself and into the lateral recesses of the ribs of the valve stem. The dome-shaped lower rib portions are connected to the end flange to support a valve control spring acting on the other side of the wall. Furthermore, this novel configuration forcibly provides a larger outer connecting cross-section beyond the cavity in the interior of the valve stem itself the more the valve head opens on the other side of the valve hole. As the end flange of the valve stem approaches the valve hole with increasing spring force, a larger portion of the recesses and cavity establishes communication with the valve hole.

Once pressure compensation has occured, and in order to ensure an automatic satisfactory re-sealing closure of the valve seat, the invention is further characterized by the feature that an elastic or resilient sealing plate is centrally retained between the stem and the valve head and is pretensioned in the region of its outer circumference into an arcuate disk-shaped form by abutting against a rounded annular collar on the valve head. The collar is of somewhat larger inner diameter relative to the smaller outer diameter of the rounded seat of the valve hole. The collar is centrally retained and pressed in position all around over the raised rounded seat of the valve hole.

The invention will be described further, by way of example, with reference to the accompanying drawings.

DESCRIPTION OF THE PREFERRED EMBODIMENT

Figure 1:
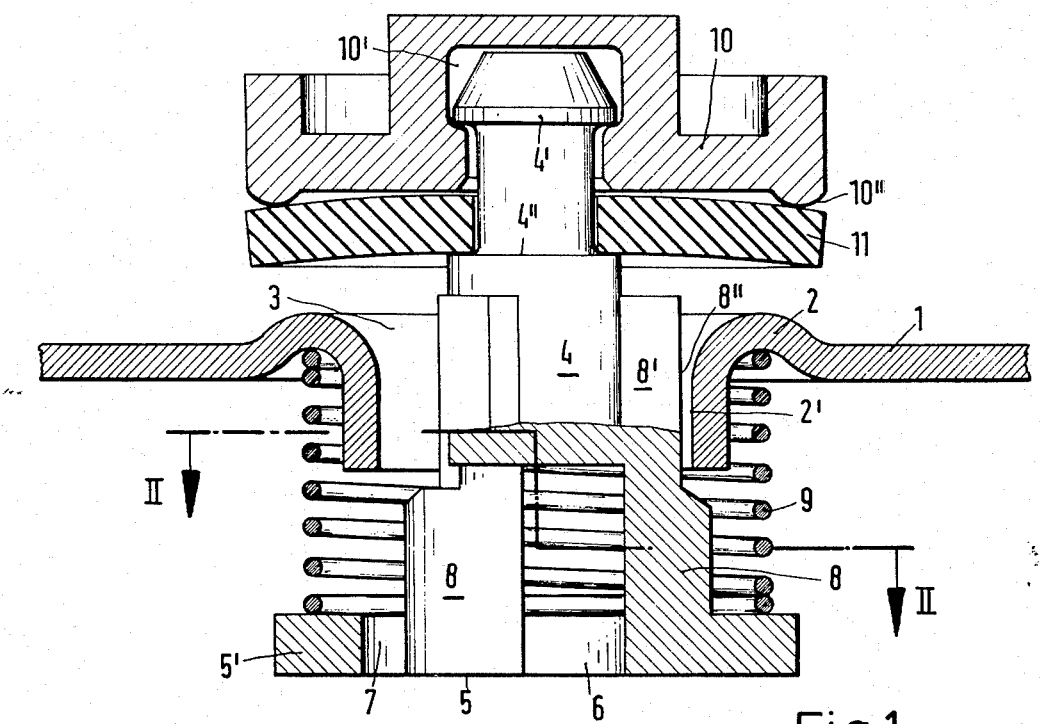
FIG. 1 is a central section through a pressure compensation valve having a stem tappet extending through the valve hole.

In the drawings, a section of a partition wall or valve support 1 is shown having a valve hole or passageway 3 therein provided with a raised annular valve seat 2 having a sealing rounded edge. A stem tappet 4 is located in the valve hole 3 and carries a valve head 10 mounted on one side of a sealing element or plate 11. Stem 4 extends through the hole 3 to the other side of the wall 1. Annular end flange 5' serves as abutment support for the compression spring 9 acting against the wall 1. The valve is shown slightly opened by being displaced against the force of a compression spring 9 so that valve head 10 and sealing valve plate 11 are slightly raised from the seat 2, so that with respect to the pressure compensation hitherto possible, a substantially larger pressure compensating cross-section is provided laterally outwards towards the hole 3, due to the hollow cavity 6 at the valve stem exposed end 5, and the lateral recesses 7 located between vertical rib portions 8 and 8'.

Figure 2:
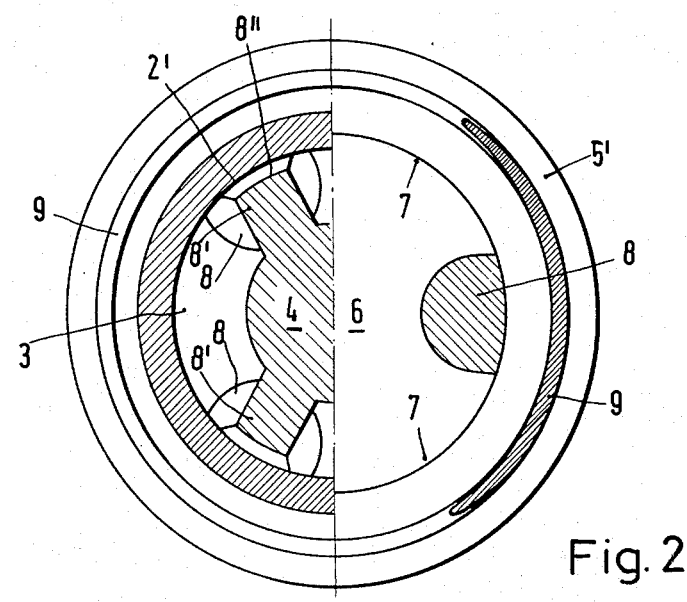
FIG. 2 is a section taken on the line II—II of FIG. 1.

Besides provision of a considerable compensating cross-section resulting from only a slight opening of the composite valve plate 10, 11, there is provided a further important advantage according to the invention. As the end flange 5' approaches the valve hole 3, the lateral openings 7 between the ribs open to an increasing extent. With increasing opening of the valve, increased gas flow from the hollow cavity 6 and the recesses 7 occurs directly towards the valve hole 3. Upper rib portions 8' are mounted vane-like on the solid stem portion 4 as shown in the left-hand half of FIG. 2 and are arranged within the valve hole 3 with a lesser guide clearance relative to the axially drawn-in tubular wall portion 2'. For guiding the valve tappet 4 within the valve hole 3, three vane-like ribs 8,8' are used and spaced equidistantly over the circumference of the stem with their outer edges 8" having slight spacing relative to the drawn-in hole wall 2' as is evident from the left-hand half of FIG. 2 and also in part elevation of FIG. 1.

It can be appreciated that hitherto a pressure compensation could only occur in unfavourable manner with the use of a solid stem tappet with the valve head providing only a small valve opening through the spacings between thread convolutions of a control compression spring 9 towards valve hole 3. Furthermore, with the occurrence of greater pressure differences with the valve opened widely against spring force, the cross-sectional passage area between these spring convolutions become constantly constricted or even completely sealed with adjacently abutting spring convolutions, whereas in such condition a particularly large cross-sectional passage area is desired.

The invention provides a partially hollow valve tappet and dome-shaped connecting ribs 8, 8' which extend in a vertical direction from the end flange edge 5' for supporting a compression spring 9. This feature automatically and quickly compensates for large pressure differentials existing at opposite ends of the valve stem. There is thus obtained a larger cross-sectional flow area for the pressurized fluid flowing towards the valve hole 3 even with only a slight opening of the valve head 10, 11. Furthermore, with increased opening of the valve, the pressure compensating cross-section accordingly also increases because of the hollow cavity 6, since the size of the recesses 7 between lower rib portions 8 of dome-shaped configuration at the hollow ring 5' likewise increase. When the control compression spring 9 is in a fully compressed state, compensation can still occur because gas flows from the hollow cavity 6 via the laterally larger openings 7 to the valve hole 3. Thus an even swifter compression compensation can occur and the valve is also able to more swiftly close hermetically subject to the restoring action of the control spring 9.

The solid material portion of the stem tappet 4 has a stepped, knob-like end portion 4' by which it is retained with snap fit and loosely guided in a correspondingly hollowed out mounting recess 10' in the centre of the valve head 10. Between the valve head 10 and a supporting shoulder 4" of the valve stem 4, a plate 11 of rubber, synthetic rubber or the like sealing material is provided for sealing relative to the seat 2 of the valve hole 3 and is inserted so that it abuts with pretension in a dish-shaped concave form against the collar 10" of the valve head.

Further according to the invention and for providing centered seating of this sealing plate 11 and also of the valve head 10 seated on the valve tappet 4 relative to the valve aperture 3 or its valve seat 2, the sealing plate 11 is mounted under pretension in an arcuate shape on the valve head 10. The plate 11 is shaped by collar 10".

Collar 10" has a somewhat larger inside diameter than the outside diameter of the seat 2 of the hole. The collar 10" presses the plate 11 all around the seat 2. This causes the sealing plate 11 over its outer circumference by means of the collar 10" to be tightened, sealed and centered on the valve head 10. The somewhat larger outer diameter of the collar 10" relative to the seat 2 which is of somewhat smaller diameter provides a particularly good sealing effect. Moreover, the dish-shaped sealing plate 11 retained under pretension by the collar 10" is pressed flat with the valve seat closed, and will then be in flat abutment accordingly relative to the seat 2 on the valve hole 3.

The valve portions may be constituted by synthetic plastic material or by metal material.

I claim:

1. In an arrangement for preventing fluid pressure from exceeding a predetermined value, a combination comprising a valve support having a raised annular valve seat which bounds a passageway for a pressurized fluid, said passageway extending between a fluid inlet at one side of said support and a fluid outlet at the other side of said support; a valve stem extending through and mounted for movement along said passageway, said stem having an exposed end at said one side of said support which faces and is acted upon by the pressurized fluid to thereby move said stem when the pressure of the fluid exceeds the predetermined value, and another opposite end at said other side of said support; a valve head mounted at said other end for movement with said stem, said head having a raised annular collar which extends circumferentially about said annular seat; a dish-shaped resilient element mounted on said stem for movement therewith, said resilient element engaging said annular collar and overlying said annular seat; a flange at said exposed end and overlying said one side of said support; biasing means surrounding said stem intermediate said flange and said one side of said support, said biasing means being operative for moving said stem and urging said collar and said resilient element into sealing engagement with said seat when the pressurized fluid acting on said exposed end is below the predetermined value; and means for establishing fluid communication between said exposed end and said passageway, including a plurality of ribs equidistantly spaced circumferentially of said stem, each rib having an upper rib portion extending lengthwise of said stem and a lower rib portion extending from said upper rib portion to said flange, each lower rib portion having a larger cross-sectional dimension than said upper rib portion for strengthening said flange, each two circumferentially adjacent ribs bounding a channel and all of said lower rib portions bounding a cavity at said exposed end, each channel communicating with said cavity and with said passageway when the pressure of the fluid in said cavity exceeds the predetermined value and moves each channel into communication with said passageway.

2. A combination as defined in claim 1; and further comprising means for mounting said valve head on said other end of said stem with snap action, including a mounting recess on said valve head and operative for receiving said other end of said stem.

3. A combination as defined in claim 1; and further comprising means for firmly fixing the position of said valve head relative to said valve stem, including an abutment shoulder on said stem and engaging an inner central portion of said resilient element at one side of the latter; and wherein said annular collar extends towards said resilient element and engages an outer marginal portion of the latter at the other side of said resilient element to thereby pretension the latter with a concavely-curved configuration which exerts a force against said valve head and fixes the position of the latter relative to the valve stem.

4. A combination as defined in claim 1, wherein said annular valve seat and said annular collar are circular rounded projections, and wherein the outside diameter of said annular collar is greater than the outside diameter of said valve seat.

5. A combination as defined in claim 1, wherein each upper rib portion has a generally quadrilateral cross-section; and wherein each lower rib portion has a generally dome-shaped cross-section.

6. A combination as defined in claim 1, wherein said valve stem, said valve head, said flange and said ribs are all constituted by synthetic plastic material.

7. In an arrangement for preventing gas pressure from exceeding a predetermined value, a combination comprising a valve support having a raised annular valve seat which bounds a passageway for a pressurized gas, said passageway extending between a gas inlet at one side of said support and a gas outlet at the other side of said support; a valve stem extending through and mounted for movement along said passageway, said stem having an exposed end at said one side of said support which faces and is acted upon by the pressurized gas to thereby move said stem when the pressure of the gas exceeds the predetermined value, and another opposite end at said other side of said support; a valve head mounted at said other end for movement with said stem, said head having a raised annular collar which extends circumferentially about said annular seat; a dish-shaped resilient element mounted on said stem for movement therewith, said resilient element engaging said annular collar and overlying said annular seat; a flange at said exposed end and overlying said one side of said support; biasing means surrounding said stem intermediate said flange and said one side of said support, said biasing means being operative for moving said stem and urging said collar and said resilient element into sealing engagement with said seat when the pressurized gas acting on said exposed end is below the predetermined value; and means for establishing gas communication between said exposed end and said passageway, including a plurality of ribs equidistantly spaced circumferentially of said stem, each rib having an upper rib portion extending lengthwise of said stem and a lower rib portion extending from said upper rib portion to said flange, each lower rib portion having a larger cross-sectional dimension than said upper rib portion for strengthening said flange, each two circumferentially adjacent ribs bounding a channel and all of said lower rib portions bounding a cavity at said exposed end, each channel communicating with said cavity and with said passageway when the pressure of the gas in said cavity exceeds the predetermined value and moves each channel into communication with said passageway.

* * * * *